(12) United States Patent
Gall et al.

(10) Patent No.: US 10,471,890 B2
(45) Date of Patent: Nov. 12, 2019

(54) UNDER HOOD LIGHT

(71) Applicant: MILWAUKEE ELECTRIC TOOL CORPORATION, Brookfield, WI (US)

(72) Inventors: Benjamin D. Gall, Wauwatosa, WI (US); David Proeber, Milwaukee, WI (US); Jason R. Crowe, Wauwatosa, WI (US); Brian Cornell, West Allis, WI (US); Josh Adams, Milwaukee, WI (US); Alan Amundson, Milwaukee, WI (US); Joshua Schermerhorn, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 135 days.

(21) Appl. No.: 15/794,166

(22) Filed: Oct. 26, 2017

(65) Prior Publication Data

US 2018/0111547 A1   Apr. 26, 2018

Related U.S. Application Data

(60) Provisional application No. 62/412,894, filed on Oct. 26, 2016.

(51) Int. Cl.
*B60Q 3/35* (2017.01)
*F21L 4/08* (2006.01)
(Continued)

(52) U.S. Cl.
CPC .................. *B60Q 3/35* (2017.02); *F21L 4/08* (2013.01); *F21V 21/0885* (2013.01); *F21W 2131/402* (2013.01)

(58) Field of Classification Search
None
See application file for complete search history.

(56) References Cited

U.S. PATENT DOCUMENTS 1,653,418 A  12/1927  Sorgius
1,675,026 A   6/1928  Goldthwaite
(Continued)

FOREIGN PATENT DOCUMENTS

DE   1801781   12/1959
DE   7706075    4/1978
(Continued)

OTHER PUBLICATIONS

International Search Report and Written Opinion for Application No. PCT/US2017/058408 dated Jan. 30, 2018, 15 pages.

*Primary Examiner* — Elmito Breval
(74) *Attorney, Agent, or Firm* — Michael Best & Friedrich LLP

(57) ABSTRACT

A carrier assembly for a light includes a main housing having a first end, a second end, and a main axis extending between the first end and the second end. The carrier assembly also includes an extension member slidably coupled to the main housing for movement along the main axis between a retracted position and an extended position. The extension member is biased toward the retracted position. The carrier assembly further includes a wireform hook extending from the first end of the main housing. The wireform hook includes two legs coupled to the extension member for movement with the extension member. The carrier assembly also includes a bracket member coupled to the wireform hook. The bracket member includes a base material extending between the two legs of the wireform hook and a second material overlaying a portion of the base material. The second material is softer than the base material.

20 Claims, 7 Drawing Sheets

(51) Int. Cl.
*F21V 21/088* (2006.01)
*F21W 131/402* (2006.01)

(56) References Cited

U.S. PATENT DOCUMENTS

| | | | |
|---|---|---|---|
| 1,933,337 A | 10/1933 | Piombo |
| 2,089,850 A | 8/1937 | Kenney |
| 2,532,023 A | 11/1950 | Guth, Jr. |
| 3,175,186 A | 3/1965 | Barenyi |
| 3,278,741 A | 10/1966 | Woods |
| 3,287,548 A | 11/1966 | Kompier |
| 4,054,789 A | 10/1977 | Romanelli |
| 4,080,571 A | 1/1978 | Robertson et al. |
| 4,136,904 A | 1/1979 | Lauderdale |
| 4,197,573 A | 4/1980 | Thatch |
| 4,298,922 A | 11/1981 | Hardwick |
| 4,564,894 A | 1/1986 | Gonzalez |
| 4,598,343 A | 7/1986 | Sorrell |
| 4,683,521 A | 7/1987 | Poleschuk et al. |
| 5,243,505 A | 9/1993 | Carr |
| 5,307,248 A | 4/1994 | Wenzlick |
| 5,436,417 A | 7/1995 | Dault et al. |
| 5,504,287 A | 4/1996 | Cable |
| 5,521,806 A | 5/1996 | Hutzel et al. |
| 5,568,968 A | 10/1996 | Jaramillo |
| 5,644,287 A | 7/1997 | Nouri |
| 5,722,759 A | 3/1998 | Eklov et al. |
| 5,798,912 A | 8/1998 | Brown et al. |
| 5,836,679 A | 11/1998 | Klamm |
| 5,993,031 A | 11/1999 | Krise |
| 6,164,803 A | 12/2000 | Reniger et al. |
| 6,169,373 B1 | 1/2001 | Reisinger et al. |
| 6,799,863 B2 | 10/2004 | Offiler et al. |
| 6,857,756 B2 | 2/2005 | Reiff et al. |
| 6,979,100 B2 | 12/2005 | Reiff et al. |
| 7,229,185 B1 | 6/2007 | Galvez et al. |
| 7,367,689 B2 | 5/2008 | Huang |
| 7,401,940 B2 | 7/2008 | Min |
| D575,430 S | 8/2008 | Jiang |
| 7,648,261 B2 | 1/2010 | Ko et al. |
| 7,682,036 B2 | 3/2010 | Reiff et al. |
| 8,506,111 B2 | 8/2013 | Woods |
| 8,646,622 B2 | 2/2014 | Wollert |
| 8,789,963 B2 | 7/2014 | Whitfield et al. |
| 8,833,986 B2 | 9/2014 | MacGregor |
| 9,010,550 B2 | 4/2015 | Figueroa |
| 9,046,231 B2 | 6/2015 | Christ et al. |
| 2004/0057229 A1 | 3/2004 | Thomas |
| 2008/0117644 A1 | 5/2008 | Le |
| 2008/0185409 A1* | 8/2008 | Kellenberger ............ A45F 3/14 224/257 |
| 2009/0072165 A1 | 3/2009 | Townsend |
| 2009/0303739 A1 | 12/2009 | Garcia |
| 2012/0182749 A1 | 7/2012 | MacGregor |
| 2013/0155709 A1 | 6/2013 | Kim et al. |
| 2013/0200020 A1 | 8/2013 | Wollert |
| 2015/0251598 A1 | 9/2015 | Andrews |

FOREIGN PATENT DOCUMENTS

| | | |
|---|---|---|
| DE | 9012701 | 11/1990 |
| GB | 771963 | 4/1957 |
| WO | 0057103 | 9/2000 |

* cited by examiner

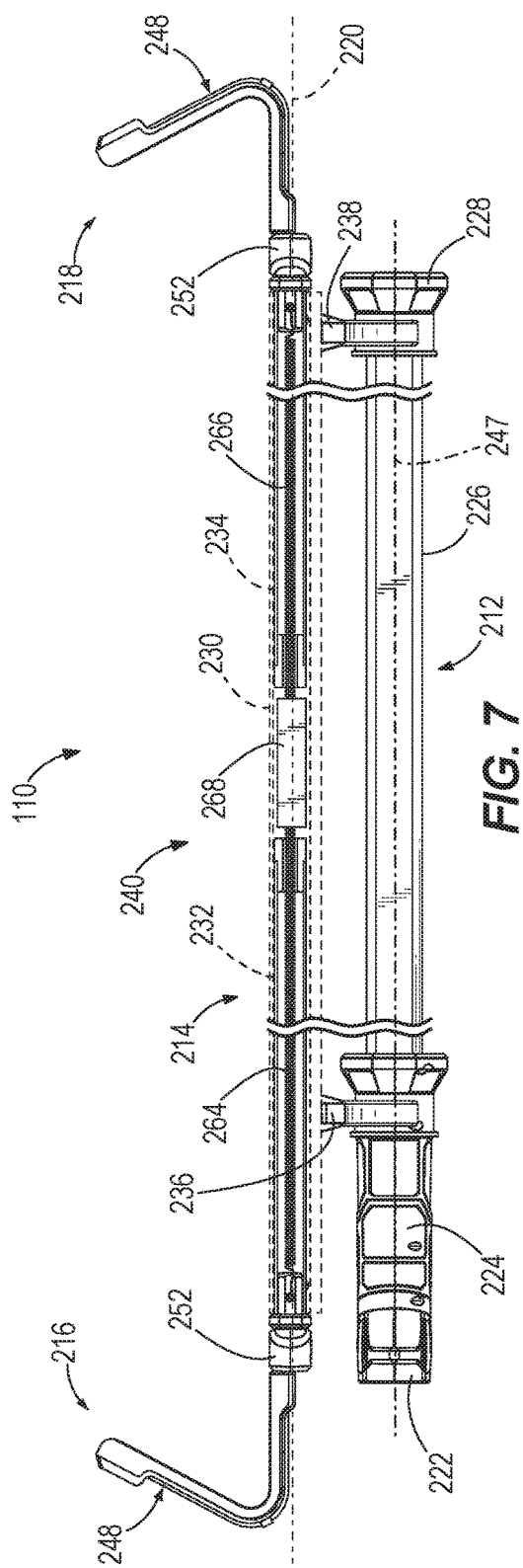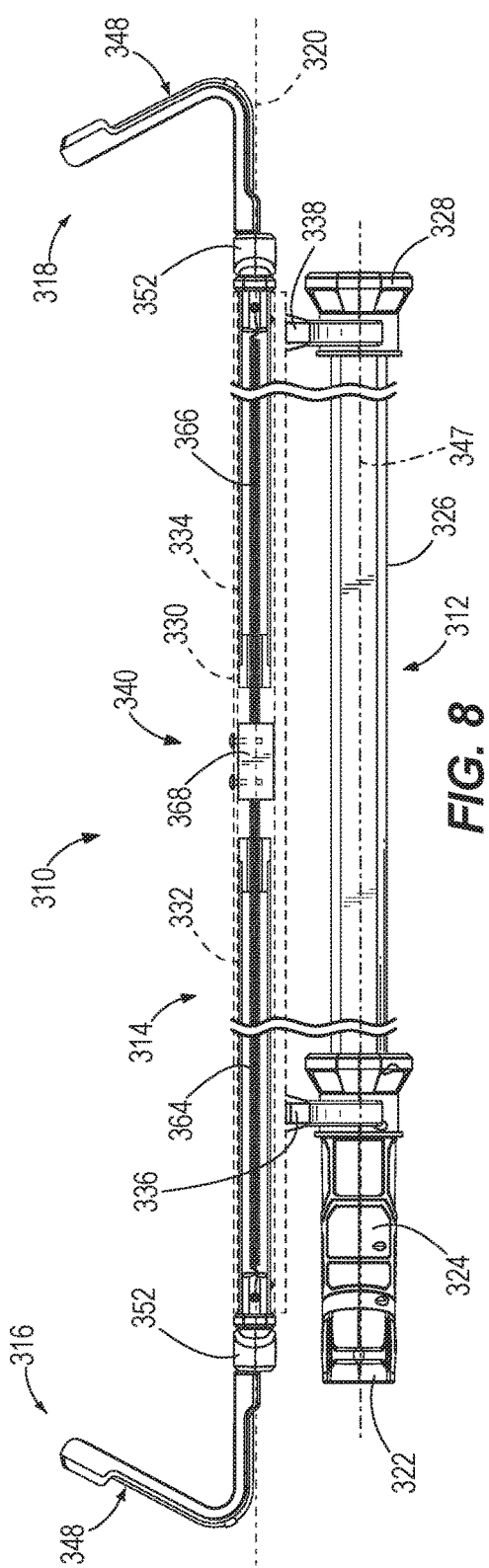

UNDER HOOD LIGHT

CROSS-REFERENCE TO RELATED APPLICATIONS

This application claims priority to U.S. Provisional Patent Application No. 62/412,894, filed Oct. 26, 2016, the entire contents of which are incorporated by reference herein.

BACKGROUND

The present invention relates to a light assembly and, more specifically, a utility light assembly.

SUMMARY

In one aspect, the invention provides a carrier assembly for a light. The carrier assembly includes a main housing having a first end, a second end, and a main axis extending between the first end and the second end. The main housing is configured to support the light. The carrier assembly also includes an extension member slidably coupled to the main housing for movement along the main axis between a retracted position and an extended position. The extension member is biased toward the retracted position. The carrier assembly further includes a wireform hook extending from the first end of the main housing. The wireform hook includes two legs coupled to the extension member for movement with the extension member. The carrier assembly also includes a bracket member coupled to the wireform hook. The bracket member includes a base material extending between the two legs of the wireform hook and a second material overlaying a portion of the base material. The second material is softer than the base material.

In another aspect, the invention provides a utility light assembly including a light having an elongated housing and a light element supported by the elongated housing. The utility light assembly also includes a carrier assembly having a main housing having a first end, a second end, and a main axis extending between the first end and the second end. The main housing is configured to support the light. The carrier assembly also has an extension member slidably coupled to the main housing for movement along the main axis between a retracted position and an extended position. The extension member is biased toward the retracted position. The carrier assembly further has a wireform hook extending from the first end of the main housing. The wireform hook includes two legs coupled to the extension member for movement with the extension member. The carrier assembly also has a bracket member coupled to the wireform hook. The bracket member includes a base material extending between the two legs of the wireform hook and a second material overlaying a portion of the base material. The second material is softer than the base material.

In yet another aspect, the invention provides a utility light assembly for a hood of an automobile. The utility light assembly includes a light having an elongated housing and a lighting element supported by the elongated housing. The utility light assembly further includes a carrier assembly having a main housing with a first end, a second end, and a main axis extending between the first end and the second end. The main housing supports the light. The carrier assembly further includes a first extension member slidably coupled to the main housing for movement along the main axis between a retracted position and an extended position, a second extension member slidably coupled to the main housing for movement along the main axis between a retracted position and an extended position, and a biasing mechanism coupled to the first extension member and the second extension member to bias the first extension member and the second extension member to the retracted positions. The carrier assembly further includes a first wireform hook extending from the first end of the main housing and a second wireform hook extending from the second end of the main housing. The first wireform hook includes two legs coupled to the first extension member for movement with the first extension member, and the second wireform hook includes two legs coupled to the second extension member for movement with the second extension member. The carrier assembly further includes a first bracket member coupled to the first wireform hook. The first bracket member includes a base material made of rigid plastic extending between the two legs of the first wireform hook and an elastomeric material overmolded onto a portion of the base material. The elastomeric material is configured to contact the hood of the automobile. The carrier assembly also includes a second bracket member coupled to the second wireform hook. The second bracket member includes a base material made of rigid plastic and extending between the two legs of the second wireform hook and an elastomeric material overmolded onto a portion of the base material. The elastomeric material is configured to contact the hood of the automobile.

Other aspects of the invention will become apparent by consideration of the detailed description and accompanying drawings.

BRIEF DESCRIPTION OF THE DRAWINGS

FIG. 7 is a side view of a utility light assembly in accordance with another embodiment of the invention.

FIG. 8 is a side view of a utility light assembly in accordance with another embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof unless specified or limited otherwise, the terms "mounted," "connected," "supported," and "coupled" and variations thereof are used broadly and encompass both direct and indirect mountings, connections, supports, and couplings. As used herein with respect to values, the term "about" means within one significant figure.

Figure 1:
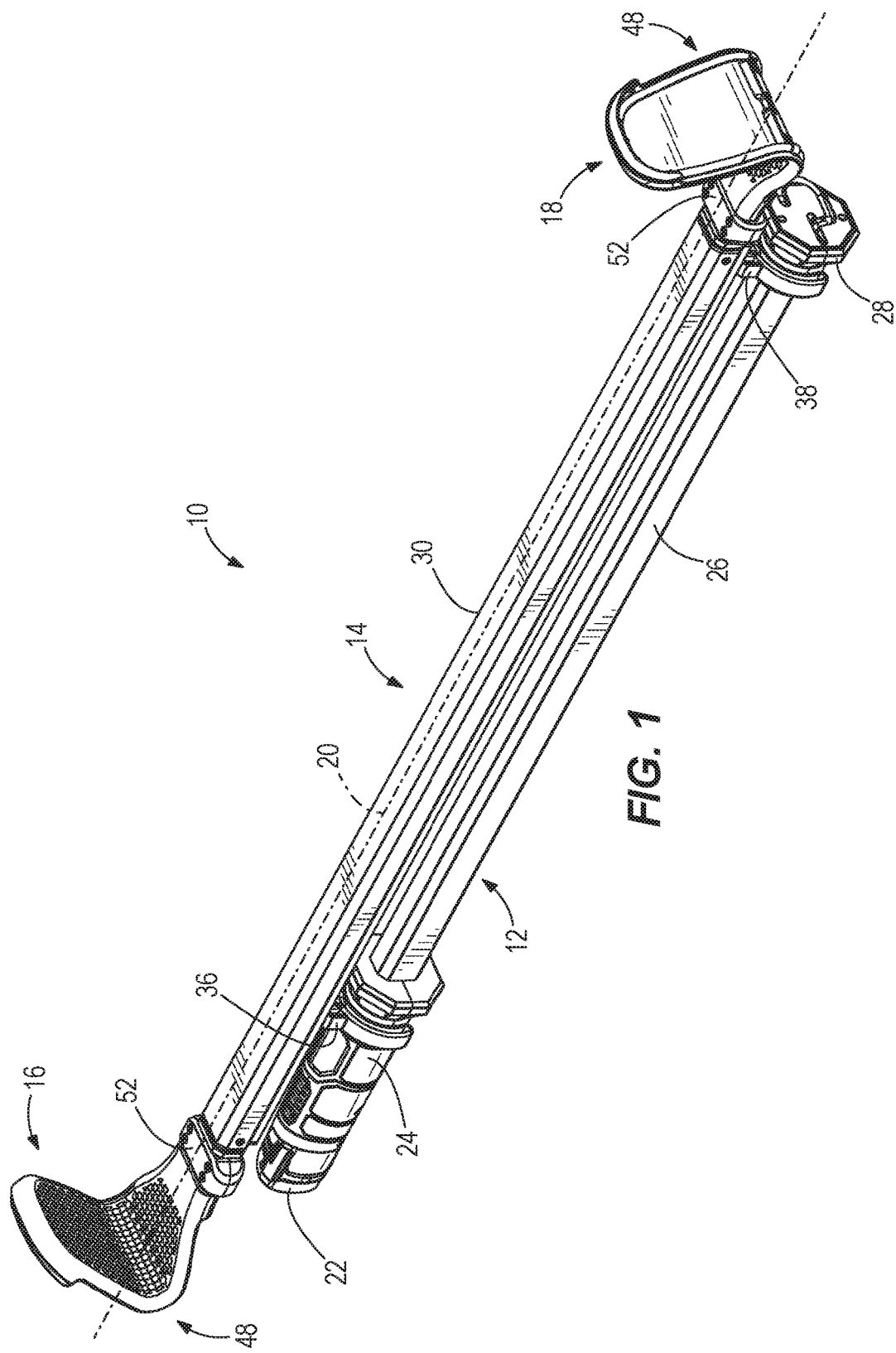
FIG. 1 is a perspective view of a utility light assembly in accordance with an embodiment of the invention.
Figure 2:
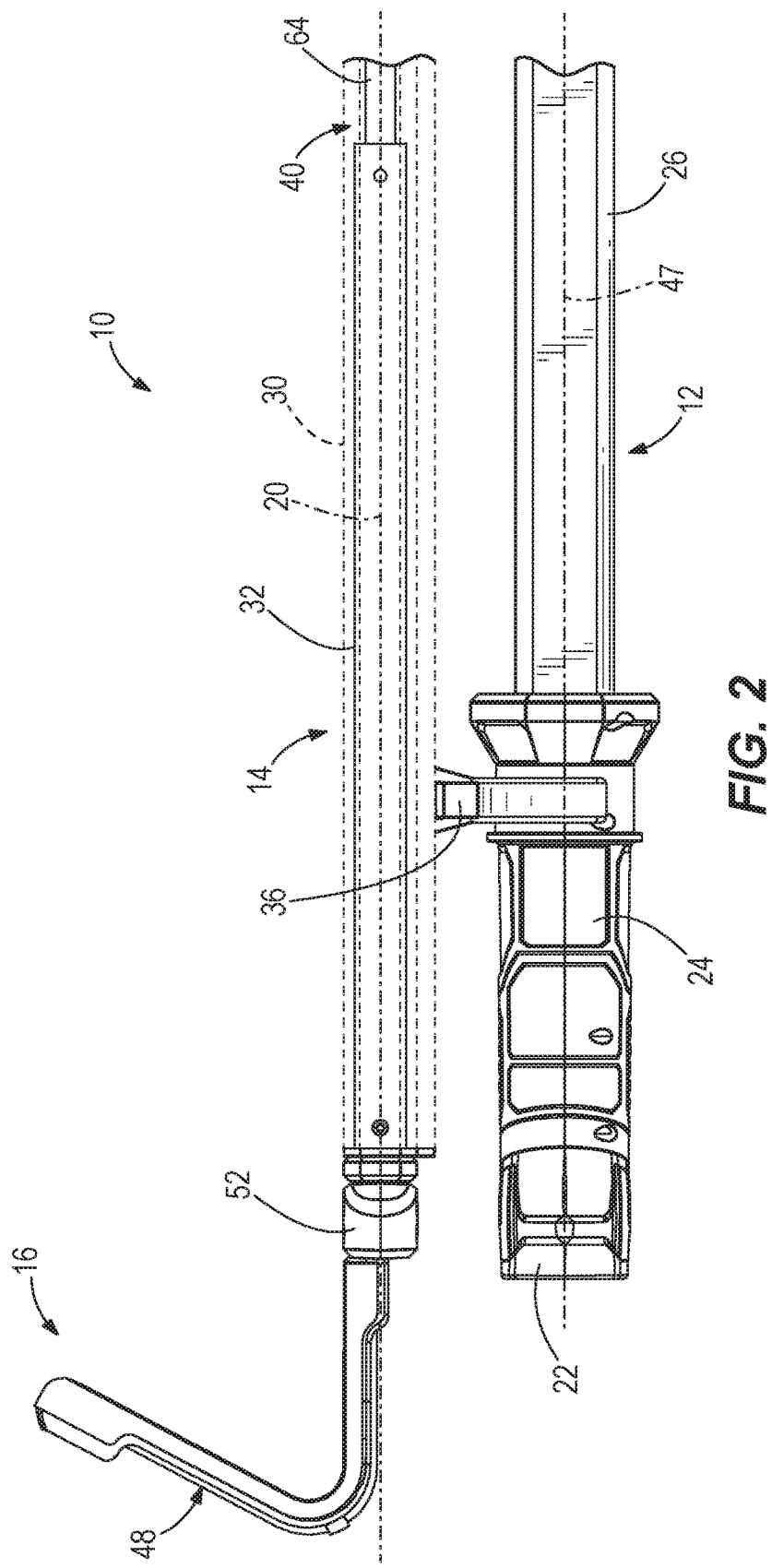
FIG. 2 is an enlarged side view of a portion of the utility light assembly of FIG. 1.

FIGS. 1 and 2 illustrate a utility light assembly 10 that can be coupled to a hood of an automobile in order to illuminate an engine bay of the automobile. Although the light assembly 10 is described for use with an automobile, the light assembly 10 may also be used to hang from other objects or surfaces, such as a shelf, rafters, pipes or conduits, and the like. As illustrated in FIG. 1, the utility light assembly 10 includes a light 12 and a carrier assembly 14 to support the light 12 relative to the hood of the automobile. The carrier assembly 14 has a first end 16, a second end 18, and a main axis 20 extending between the first and second ends 16, 18. The light 12 is substantially parallel to the main axis 20 when the light 12 is coupled to the carrier assembly 14. The light 12 is electrically-powered (e.g., battery powered) via a battery pack 22 disposed within a handle 24 of the light 12. The battery pack 22 may be, for example, a rechargeable power tool battery pack. When powered on, the battery pack 22 supplies power to a series of lighting elements (e.g., bulbs, LED's, etc.) encased within an elongated housing 26. In some embodiments, the housing 26 is composed of a metallic material (e.g., aluminum) and includes a translucent lens coupled to the metallic housing 26 to allow light from the lighting elements to pass through the lens. In other embodiments, the housing 26 may be entirely translucent. In some cases, the light 12 is not coupled to the carrier assembly 14, such that a user can grasp either of the handle 24, an end cap 28, or both to maneuver the light 12.

Figure 3:
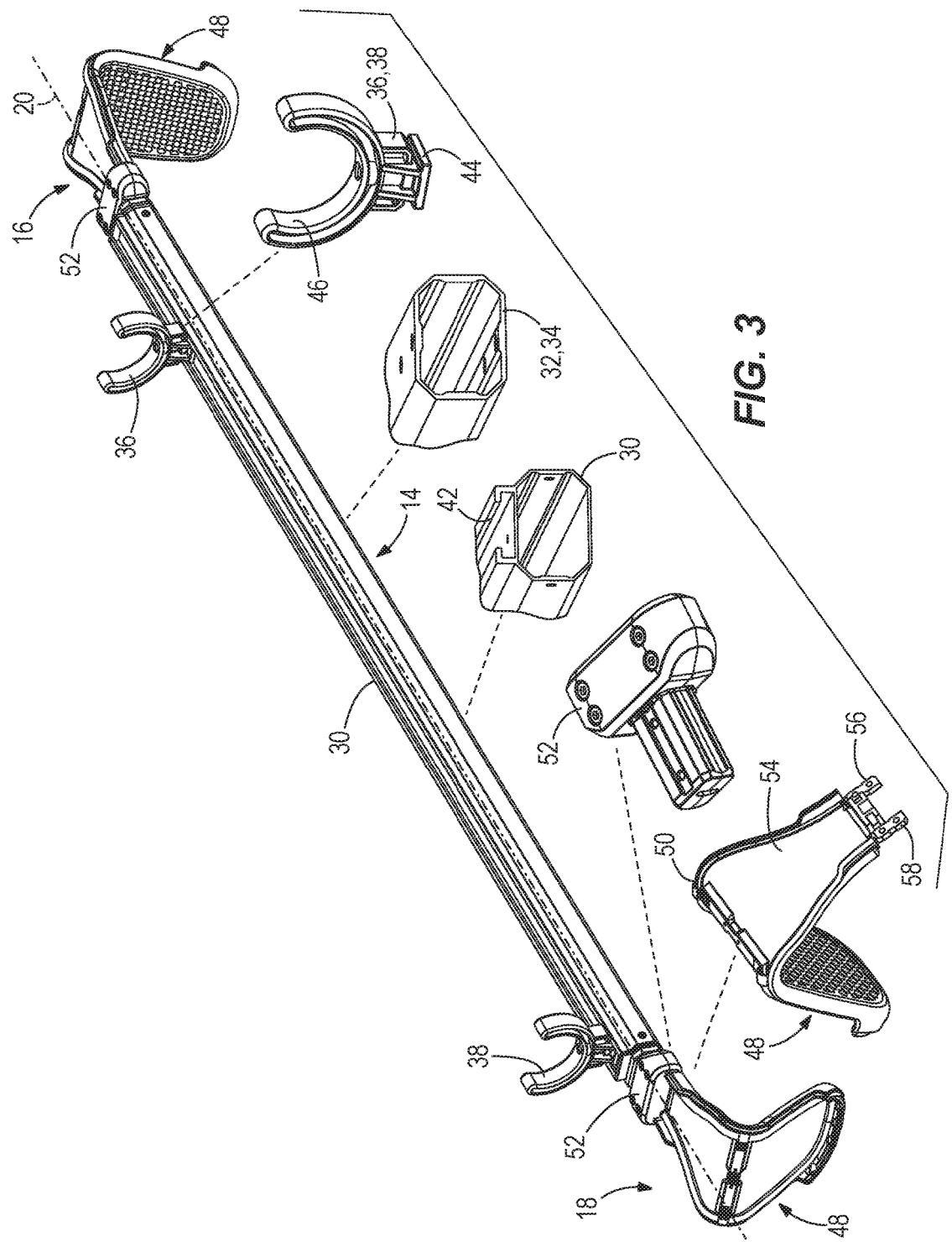
FIG. 3 is another perspective view of the utility light assembly of FIG. 1.

With reference to FIGS. 2 and 3, the carrier assembly 14 includes a main housing 30, two extension members 32, 34 disposed within the main housing 30, and two holding members 36, 38 coupled to the main housing 30. The first and second extension members 32, 34 are movable relative to the main housing 30 along the main axis 20 between a retracted position and an extended position. In the retracted position, the first and second extension members 32, 34 are entirely disposed within the main housing 30 to effectively decrease the length of the carrier assembly 14. In the extended position, the first and second extension members 32, 34 extend away from the first end 16 and the second end 18 of the main housing 30, respectively, to effectively increase the length of the carrier assembly 14. The first and second extension members 32, 34 are urged toward the retracted position via a biasing mechanism 40. The biasing mechanism 40 of the illustrated embodiment includes a spring 64 coupled to the first and second extension members 32, 34, such that the extension members 32, 34 are coupled together via the spring 64. Specifically, the spring 64 attaches to the extension members 32 adjacent the first end 16 and attaches to the other extension member 34 adjacent the second end 18. Although the spring 64 of the illustrated embodiment is a tension spring, in other embodiments, the biasing mechanism 40 may alternatively include other suitable types of springs.

The two holding members 36, 38 are also slidably coupled to the main housing 30. Specifically, as illustrated in FIG. 3, the main housing 14 includes a groove 42, which receives a T-shaped protrusion 44 of each holding member 36, 38, thereby allowing the holding members 36, 38 to translate relative to the main housing 30 in a direction parallel to the main axis 20. Each holding member 36, 38 further includes a C-shaped channel 46 to receive a portion of the light 12 to couple the light 12 to the carrier assembly 14. For example, one holding member 36 is coupled to the handle 24 of the light 12, while the other holding member 38 is coupled to the end cap 28 of the light 12. The portion of the handle 24 and the end cap 28 where the holding members 36, 38 couple has a substantially circular cross-section, such that the light 12 is permitted to rotate relative to the holding member 36, 38 about a light axis 47 that is parallel to the main axis 20. Although the illustrated embodiment includes two holding members 36, 38, in other embodiments, there may be fewer or greater than two holding members 36, 38 to hold the light 12.

Figure 4:
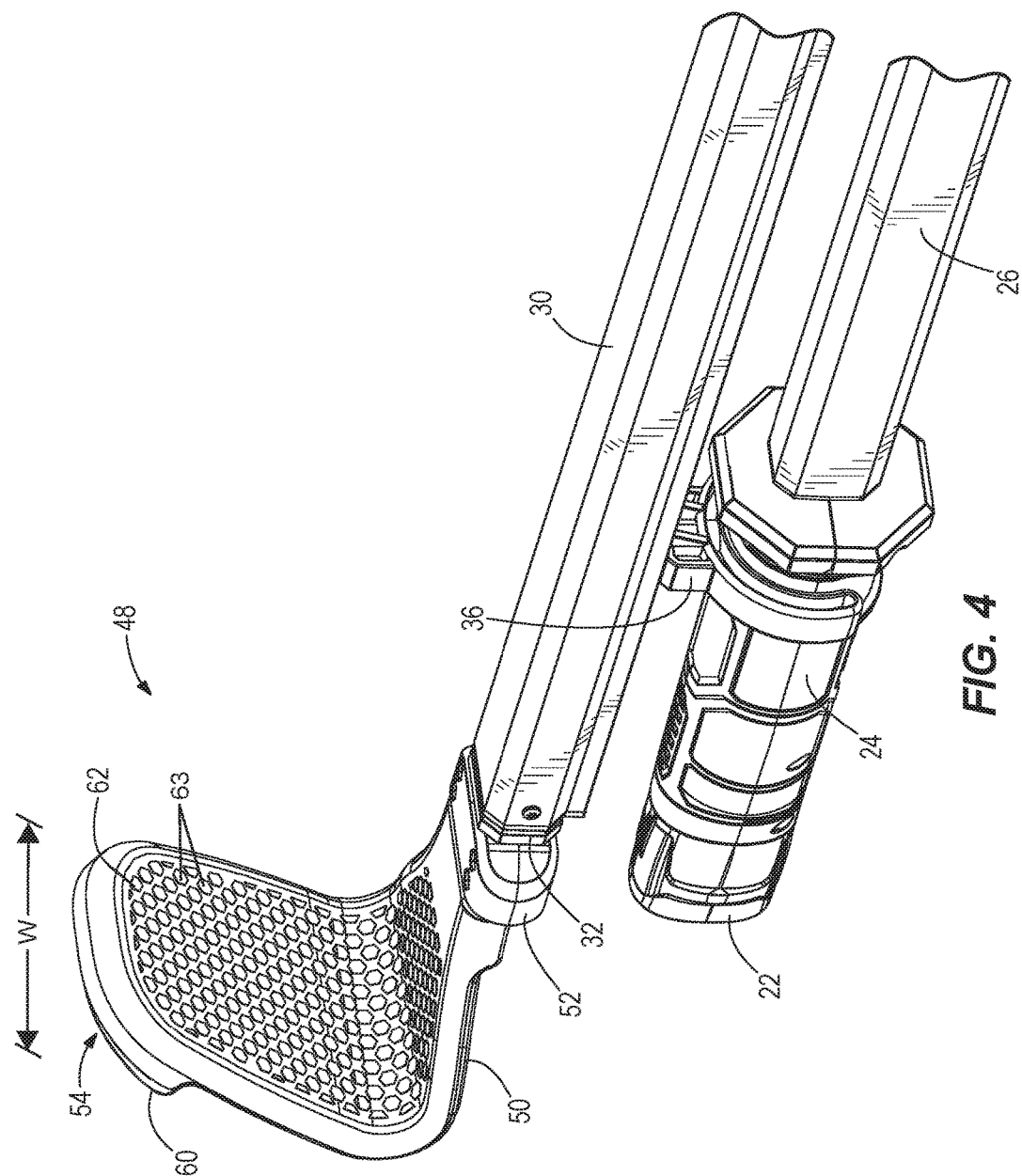
FIG. 4 is an enlarged perspective view of a portion of the utility light assembly, illustrating a first piece of a hook member.
Figure 5:
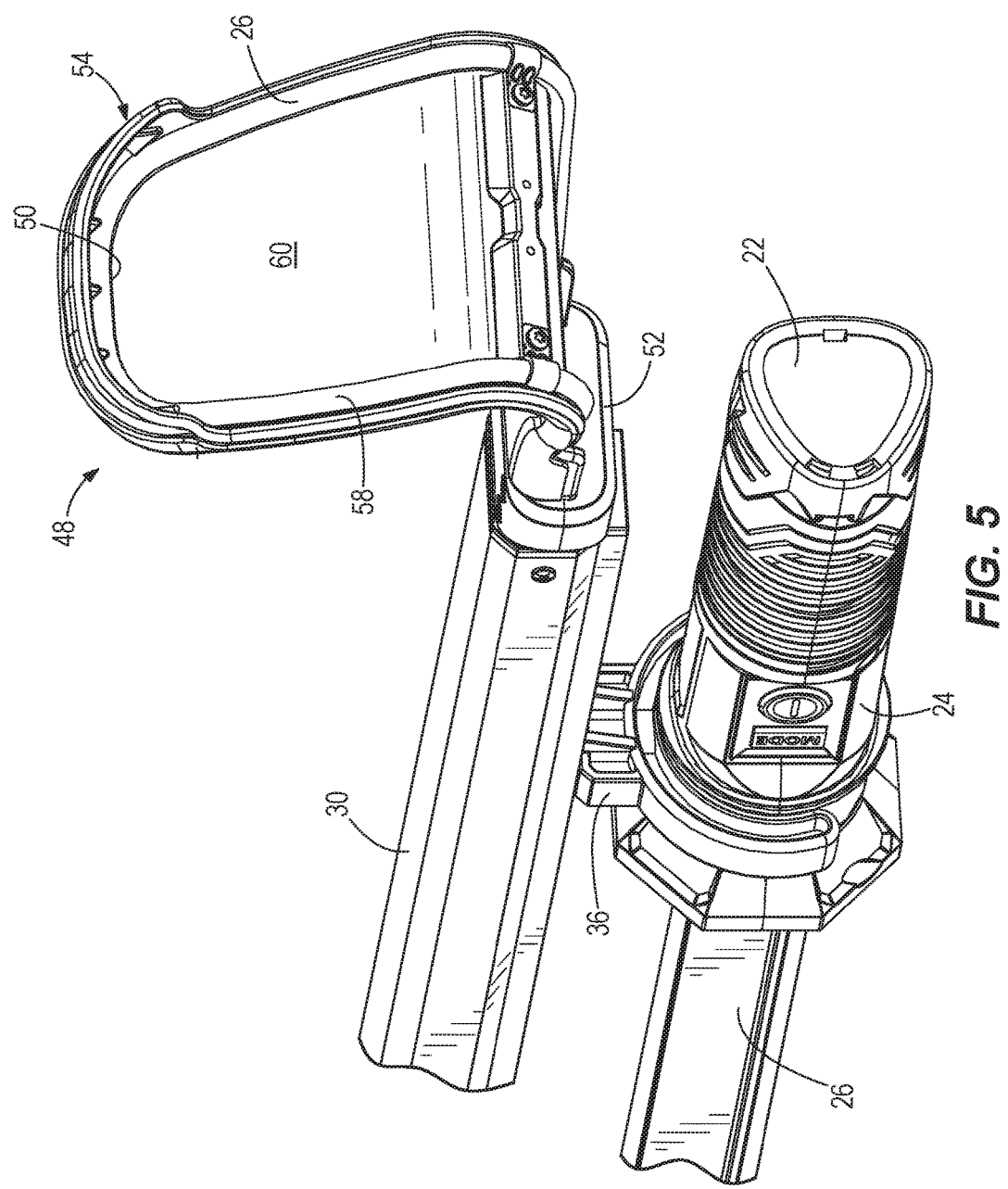
FIG. 5 is an enlarged perspective view of a portion of the utility light assembly, illustrating a second piece of a hook member

With reference to FIGS. 3-5, the carrier assembly 14 further includes two hook assemblies 48, with each disposed at one end 16, 18 of the carrier assembly 14. The hook assemblies 48 are configured to contact the hood of the automobile or other object from which the light assembly 10 is suspended. One hook assembly 48 is coupled to the first extension member 32, and the other hook assembly 48 is coupled to the second extension member 34. The hook assemblies 48 connect the utility light assembly 10 to the hood. The two hook assemblies 48 are substantially identical and, therefore, only one of the hook assemblies 48 will be subsequently described for sake of convenience and brevity.

As shown in FIGS. 4 and 5, the hook assembly 48 includes a wireform hook 50, a connector 52 to connect the wireform hook 50 to the extension members 32, and a hook bracket 54 coupled to the wireform hook 50. The wireform hook 50 includes a first leg 56 and a second leg 58 received within and extending away from the connector 52. That is, the wireform hook 50 is substantially U-shaped. However, different shaped wireform hooks may be employed to facilitate attachment to different objects. The wireform hook 50 is composed of a first material (e.g., metal). In preferred constructions, the wireform hook 50 is covered or coated with a softer material (e.g., plastic, rubber, polymer, etc.) to both protect the wire 50 and to reduce the likelihood that the wireform hook 50 will scratch or damage the object to which it is attached.

To further protect the object to which the light assembly 10 attaches, the hook assembly 48 includes the hook bracket 54. In preferred constructions the hook bracket 54 is composed of a second material (e.g., polymer, rubber, plastic, etc.) that is different from the first material. The second material is softer than the first material and thus less likely to mar the hood of the automobile. The hook bracket 54 extends between and around the legs 56, 58 of the wireform hook 48. In conventional utility light assemblies, a hook directly contacts the hood which provides minimal surface area contact between the legs of the hook and the hood. In the illustrated embodiment, the hook bracket 54 provides material extending between and around each leg 56, 58, thereby increasing the surface area contact between the hook assembly 48 and the hood.

In the illustrated embodiment, the hook bracket 54 includes a first piece 60 and a second piece 62. The first piece 60, or base material, extends between the two legs 56, 58 of the wireform hook 50. The first piece 60 may be made of, for example, a rigid plastic material. The second piece 62, or second material, overlays a portion of the first piece 60. The second piece 62 may be made of, for example, an elastomeric material. In some embodiments, the second piece 62 may be overmolded onto the first piece 60. The second piece 62 is made of a softer material than the first piece 60 to help better grip the hood (or other object) and to further reduce the possibility of scratching or marring the hood (or other object).

The illustrated second piece 62 also includes a surface texture to increase friction between the hook assembly 48 and the hood (or other object). In the illustrated embodiment, the surface texture is defined by a plurality of projections 63 that facilitate gripping the hood (or other object) with the hook bracket 54. The projections 63 are arranged in an array or other suitable layout on the second piece 62.

As noted above, the hook bracket 54 extends between the legs 56, 58 of the wireform hook 50. More particularly, the hook bracket 54 forms a continuous, generally planar surface between the legs 56, 58 of the wireform hook 50. The continuous, generally planar surface increases the amount of surface area in contact with the hood (or other object) when the hook assembly 48 engages the hood (or other object). Because the second piece 62 overlays the first piece 60 to form the continuous, generally planar surface, even if part of the second piece 62 begins to wear off over time, the plastic material of the first piece 60 will contact the hood (or other object), rather than the metal of the wireform hook 50. The wireform hook 50 and the hook bracket 54 are also bent to make the hook assembly 48 generally V-shaped.

The hook bracket 54 has a width W, measured perpendicular to the axis 20 (FIG. 1) that is generally larger than hooks on conventional utility light assemblies. The illustrated width W is at least two inches. In some embodiments, the width W is at least three inches. In further embodiments, the width W is between two inches and five inches. In the illustrated embodiment, the width W is about 3.5 inches.

In use, the user connects the utility light assembly 10 to the hood of the automobile by moving the extension members 32, 34 from the retracted position toward the extended position until a desired length is achieved that corresponds to the width of the hood. At this point, the biasing member 40 urges the extension member 32, 34 (and therefore the hook assemblies 48) toward the retracted position, thereby gripping or clamping onto the hood. The larger surface area of the hook bracket 54 assures a more secure mounting of the utility light assembly 10 to the hood. Also, if the second piece 62 of the hook bracket 54 is worn down to the first piece 60, the plastic of the first piece 60 will still inhibit marring of the hood.

Figure 6:
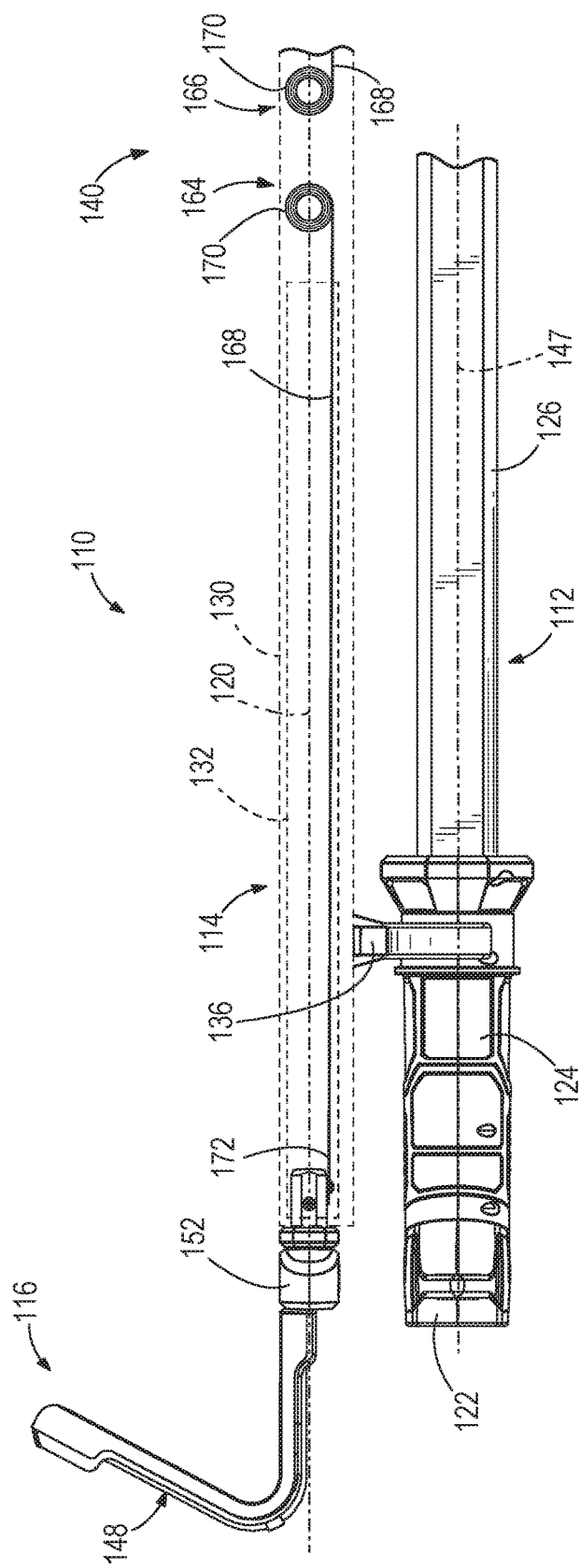
FIG. 6 is a side view of part of a utility light assembly in accordance with another embodiment of the invention.

FIG. 6 illustrates a utility light assembly 110 in accordance with another embodiment of the invention. The utility light assembly 110 includes a biasing mechanism 140, but is otherwise similar to the utility light 10 described above with reference to FIGS. 1-5, with like components being shown with like reference numerals plus 100. Differences between the utility light 10, 110 are described below.

With reference to FIG. 6, the biasing mechanism 140 includes a first spring 164 and a second spring 166. The first and second springs 164, 166 are constant-force springs such that the force exerted by the springs 164, 166 remains constant throughout entire ranges of motion. Generally, a constant-force spring (e.g., spring 164) includes a rolled tape 168 (or ribbon) of metal forming a roll portion 170 that when rolled-up is relaxed and exerts a pulling force as the roll portion 170 is unrolled. With respect to the first spring 164, the roll portion 170 is fixed to the main housing 130 while a distal end 172 of the tape 168 is coupled proximate the first end 116 to the extension member 132. With respect to the second spring 166, the roll portion 170 is also fixed to the main housing 130 while a distal end 172 of the tape 168 is coupled proximate the second end 118 to the extension member 134. As the extension members 132, 134 move toward the extended position, the tape 168 of the first and second springs 164, 166 is continuously extended as the roll portions 170 are unrolled.

FIG. 7 illustrates a utility light assembly 210 in accordance with another embodiment of the invention. The utility light assembly 210 includes a biasing mechanism 240, but is otherwise similar to the utility light 10 described above with reference to FIGS. 1-5, with like components being shown with like reference numerals plus 200. Differences between the utility light 10, 210 are described below.

With reference to FIG. 7, the biasing mechanism 240 includes a first spring 264 that biases the extension member 232 toward the retracted position, a second spring 266 that biases the extension member 234 toward the retracted position, and a sliding member 268 interposed between the first and second springs 264, 266. The first spring 264 is coupled between the sliding member 268 and the connector 252 of the hook assembly 248 proximate the first end 216, whereas the second spring 266 is coupled between the sliding member 268 and the connector 252 of the hook assembly 248 proximate the second end 218. The sliding member 268 is disposed within the main housing 230, but not fixed thereto such that the sliding member 268 is capable of sliding relative to the main housing 230 along the main axis 220. As a result, the main housing 230 (and therefore the light 212) is permitted to also move along the main axis 220, for example, towards the first end 216 without the first and second springs 264, 266 biasing the main housing 230 back towards the center when the extension members 232, 234 are in the extended position. Although the springs 264, 266 of the illustrated embodiment are tension springs, in other embodiments, the biasing mechanism 240 may alternatively include other suitable types of springs.

FIG. 8 illustrates a utility light assembly 310 in accordance with another embodiment of the invention. The utility light assembly 310 includes a biasing mechanism 340, but is otherwise similar to the utility light 10 described above with reference to FIGS. 1-5, with like components being shown with like reference numerals plus 300. Differences between the utility light 10, 310 are described below.

With reference to FIG. 8, the biasing mechanism 340 includes a first spring 364 that biases the extension member 332 toward the retracted position, a second spring 366 that biases the extension member 334 toward the retracted position, and an anchor 368 interposed between the first and second springs 364, 366. The first spring 364 is coupled between the anchor 368 and the connector 352 of the hook assembly 348 proximate the first end 316, whereas the second spring 366 is coupled between the anchor 368 and the connector 352 of the hook assembly 348 proximate the second end 318. The anchor 368 is fixedly coupled to the main housing 330, causing the main housing 330 (and therefore the light 312) to bias towards the center when the extension members 332, 334 are in the extended position. As such, when the main housing 330 is moved, for example, by a user towards the first end 316, the main housing 330 subsequently moves back towards the center when the user releases the main housing 330 as the springs 364, 366 reach equilibrium. Although the springs 364, 366 of the illustrated embodiment are tension springs, in other embodiments, the biasing mechanism 340 may alternatively include other suitable types of springs.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. A carrier assembly for a light, the carrier assembly including:
   a main housing having a first end, a second end, and a main axis extending between the first end and the second end, the main housing configured to support the light;
   an extension member slidably coupled to the main housing for movement along the main axis between a retracted position and an extended position, the extension member being biased toward the retracted position;
   a wireform hook extending from the first end of the main housing, the wireform hook including two legs coupled to the extension member for movement with the extension member; and
   a bracket member coupled to the wireform hook, the bracket member including a base material extending between the two legs of the wireform hook and a second material overlaying a portion of the base material, the second material being softer than the base material.

2. The carrier assembly of claim 1, wherein the second material of the bracket member is overmolded onto the base material.

3. The carrier assembly of claim 2, wherein the base material is a rigid plastic material, and wherein the second material is an elastomeric material.

4. The carrier assembly of claim 3, wherein the wireform hook is metal.

5. The carrier assembly of claim 1, wherein the second material includes a plurality of hexagonal projections to facilitate gripping an object with the bracket member.

6. The carrier assembly of claim 1, wherein the bracket member forms a continuous, generally planar surface between the two legs of the wireform hook.

7. The carrier assembly of claim 6, wherein the bracket member has a width, measured perpendicular to the main axis, of at least two inches, and wherein the continuous, generally planar surface extends the width.

8. The carrier assembly of claim 6, wherein the bracket member is generally V-shaped.

9. The carrier assembly of claim 1, further comprising a holding member coupled to the main housing, wherein the holding member is configured to releasably support the light.

10. The carrier assembly of claim 9, wherein the main housing includes a groove to slidably receive the holding member, permitting the holding member and the light to translate relative to the main housing in a direction parallel to the main axis.

11. The carrier assembly of claim 9, wherein the holding member is configured to allow the light to rotate about an axis parallel to the main axis.

12. The carrier assembly of claim 1, wherein the wireform hook is a first wireform hook and the bracket member is a first bracket member, and further comprising:
   a second wireform hook extending from the second end of the main housing, the second wireform hook including two legs; and
   a second bracket member coupled to the second wireform hook, the second bracket member including a base material extending between the two legs of the second wireform hook and a second material overlaying a portion of the base material, the second material being softer than the base material.

13. The carrier assembly of claim 1, further comprising a biasing mechanism to bias the extension member toward the retracted position.

14. The carrier assembly of claim 13, wherein the biasing mechanism includes a spring coupled between the main housing and the extension member.

15. The carrier assembly of claim 13, wherein the extension member is a first extension member, the hook member is a first hook member, and the bracket member is a first bracket member, and further comprising:
   a second extension member slidably coupled to the main housing for movement along the main axis between a retracted position and an extended position, the second extension member being biased toward the retracted position by the biasing mechanism;
   a second wireform hook extending from the second end of the main housing, the second wireform hook including two legs coupled to the second extension member for movement with the extension member; and
   a second bracket member coupled to the second wireform hook, the second bracket member including a base material extending between the two legs of the second wireform hook and a second material overlaying a portion of the base material, the second material being softer than the base material.

16. The carrier assembly of claim 15, wherein the biasing mechanism includes an intermediate member positioned within the housing, a first spring coupled to the first extension member and the intermediate member, and a second spring coupled to the second extension member and the intermediate member.

17. The carrier assembly of claim 16, wherein the intermediate member includes a sliding member slidably positioned within the main housing or an anchor fixedly coupled to the main housing.

18. A utility light assembly comprising:
   a light including an elongated housing and a lighting element supported by the elongated housing; and
   a carrier assembly including
     a main housing having a first end, a second end, and a main axis extending between the first end and the second end, the main housing supporting the light,
     an extension member slidably coupled to the main housing for movement along the main axis between a retracted position and an extended position, the extension member being biased toward the retracted position,
     a wireform hook extending from the first end of the main housing, the wireform hook including two legs coupled to the extension member for movement with the extension member, and
     a bracket member coupled to the wireform hook, the bracket member including a base material extending between the two legs of the wireform hook and a second material overlaying a portion of the base material, the second material being softer than the base material.

19. The utility light assembly of claim 18, wherein the light further includes a battery pack supported by the elongated housing for energizing the lighting element.

20. A utility light assembly for a hood of an automobile, the utility light assembly comprising:
   a light including an elongated housing and a lighting element supported by the elongated housing; and a carrier assembly including
 a main housing having a first end, a second end, and a main axis extending between the first end and the second end, the main housing supporting the light,
 a first extension member slidably coupled to the main housing for movement along the main axis between a retracted position and an extended position,
 a second extension member slidably coupled to the main housing for movement along the main axis between a retracted position and an extended position,
 a biasing mechanism coupled to the first extension member and the second extension member to bias the first extension member and the second extension member to the retracted positions,
 a first wireform hook extending from the first end of the main housing, the first wireform hook including two legs coupled to the first extension member for movement with the first extension member,
 a second wireform hook extending from the second end of the main housing, the second wireform hook including two legs coupled to the second extension member for movement with the second extension member,
 a first bracket member coupled to the first wireform hook, the first bracket member including a base material made of rigid plastic extending between the two legs of the first wireform hook and an elastomeric material overmolded onto a portion of the base material, the elastomeric material configured to contact the hood of the automobile, and
a second bracket member coupled to the second wireform hook, the second bracket member including a base material made of rigid plastic and extending between the two legs of the second wireform hook and an elastomeric material overmolded onto a portion of the base material, the elastomeric material configured to contact the hood of the automobile.

\* \* \* \* \*